United States Patent
Jeon

(10) Patent No.: US 7,406,078 B2
(45) Date of Patent: Jul. 29, 2008

(54) METHOD AND WIRELESS NETWORK SYSTEM FOR PROVIDING QOS ON WIRELESS NETWORK COMMUNICATING VIA POINT-TO-POINT NETWORK

(75) Inventor: Jong-gu Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 877 days.

(21) Appl. No.: 10/757,541

(22) Filed: Jan. 15, 2004

(65) Prior Publication Data

US 2005/0014510 A1   Jan. 20, 2005

(51) Int. Cl.
*H04L 12/28* (2006.01)
(52) U.S. Cl. ............................ 370/392; 370/400
(58) Field of Classification Search .................. None
See application file for complete search history.

(56) References Cited

U.S. PATENT DOCUMENTS

| | | | | |
|---|---|---|---|---|
| 5,987,011 | A * | 11/1999 | Toh | 370/331 |
| 6,535,498 | B1 * | 3/2003 | Larsson et al. | 370/338 |
| 6,954,435 | B2 * | 10/2005 | Billhartz et al. | 370/252 |
| 7,095,732 | B1 * | 8/2006 | Watson, Jr. | 370/346 |
| 7,177,295 | B1 * | 2/2007 | Sholander et al. | 370/338 |

* cited by examiner

*Primary Examiner*—Edan Orgad
*Assistant Examiner*—Jung Park
(74) *Attorney, Agent, or Firm*—Sughrue Mion, PLLC

(57) ABSTRACT

A method and wireless communication system for providing QoS in a wireless network communicating through a point-to-point network are provided. The method includes: (a) at least one of intermediate nodes and a receiving node, selecting at least one QoS management node among different nodes within a predetermined range which are not included on a forwarding route, the forwarding route reaching from a transmitting node to the receiving node via at least one intermediate node satisfying QoS requirements; (b) the selected QoS management node, managing QoS management information of the different nodes which are not included on the forwarding route; and (c) the QoS management node, changing the forwarding route on the basis of the QoS management information so that the changed forwarding route passes through a different node satisfying the QoS requirements, if it is expected that at least one intermediate existing on the forwarding route will not satisfy the QoS requirements. Therefore, it is possible to reduce end-to-end delay and route discontinuity and provide QoS in a wireless communication system.

21 Claims, 13 Drawing Sheets

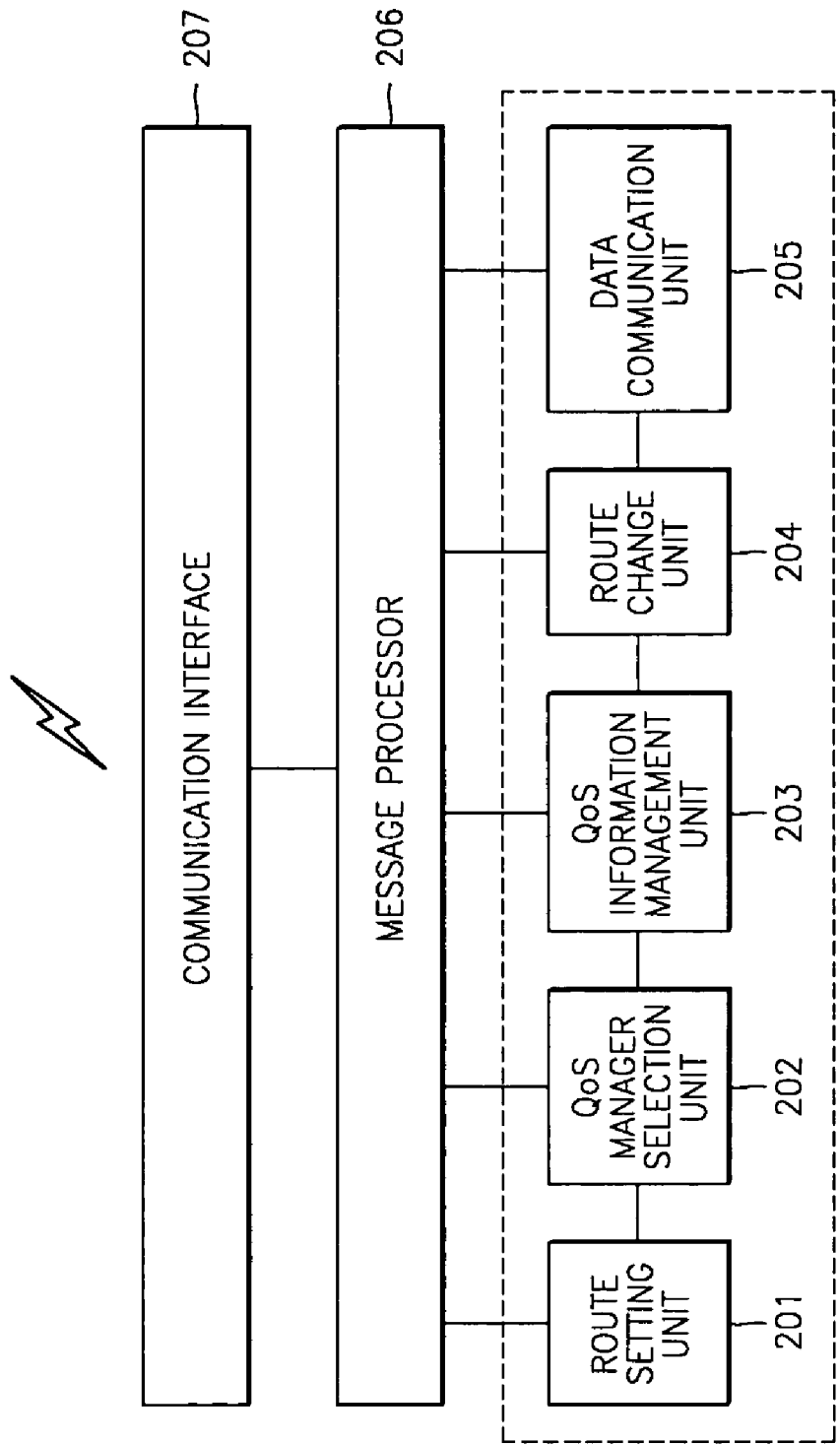

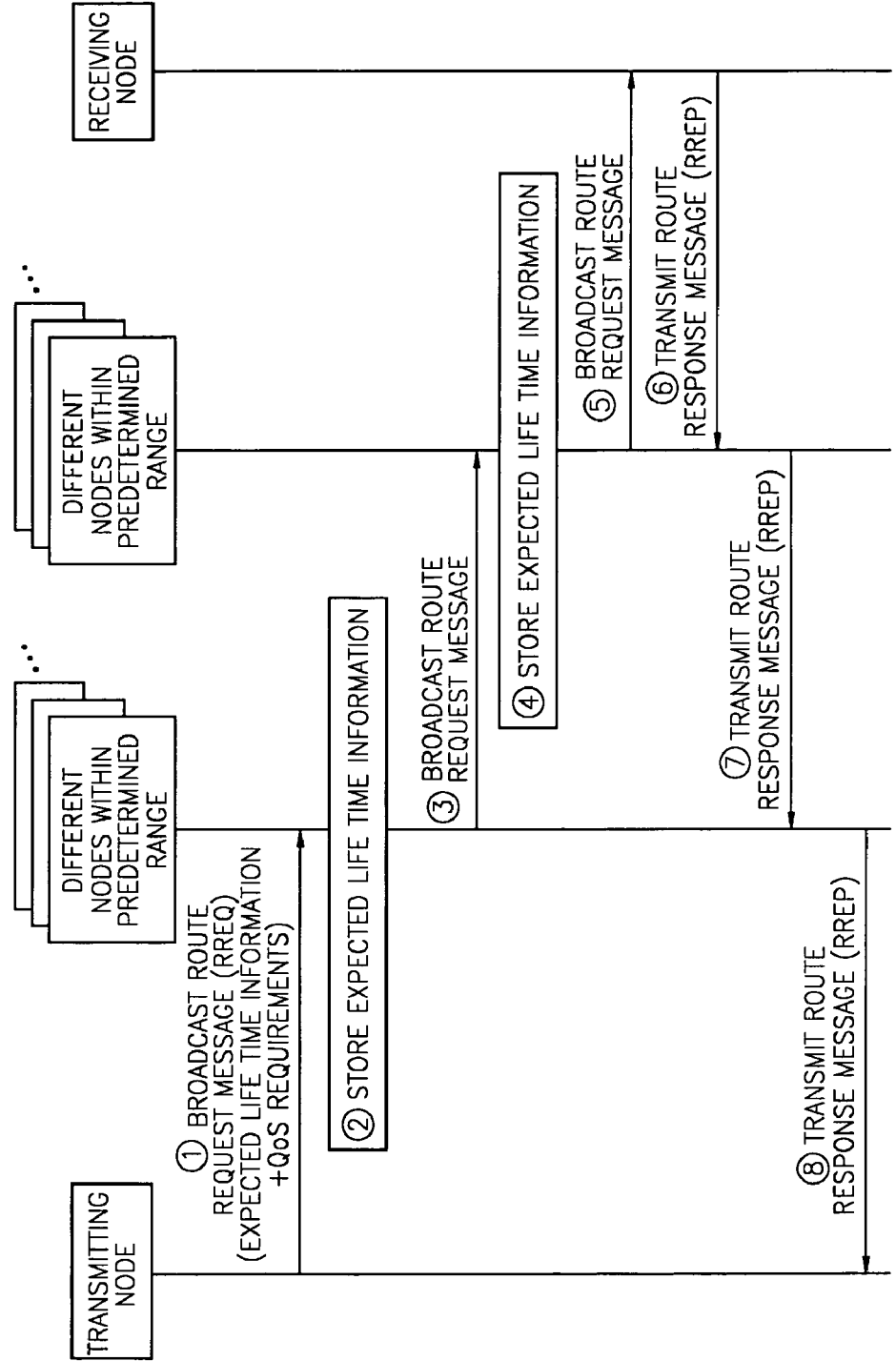

FIG. 6A

| Type | Reserved | | Hop Count |
|---|---|---|---|
| Broadcast ID | | | |
| Destination IP Address | | | |
| Destination Sequence Number | | | |
| Source IP Address | | | |
| Source Sequence Number | | | |
| Expected Life Time | | | |
| Weighting | QoS Type | Min | Max |
| Weighting | QoS Type | Min | Max |
| Weighting | QoS Type | Min | Max |
| Weighting | QoS Type | Min | Max |

# METHOD AND WIRELESS NETWORK SYSTEM FOR PROVIDING QOS ON WIRELESS NETWORK COMMUNICATING VIA POINT-TO-POINT NETWORK

BACKGROUND OF THE INVENTION

This application claims the priority of Korean Patent Application No. 2003-48431, filed on Jul. 15, 2003, in the Korean Intellectual Property Office, the disclosure of which is incorporated herein in its entirety by reference.

1. Field of the Invention

The present invention relates to a wireless network, and more particularly, to a method and wireless communication system for providing Quality of Service (QoS), in a wireless network that communicates via a point-to-point network.

2. Description of the Related Art

A wireless network that communicates via a point-to-point network (called 'Ad Hoc networking') uses an autonomous communication system in which mobile wireless nodes set and maintain appropriate forwarding routes without managements or fixed network structures such as a center server and a repeater. Such a point-to-point wireless network is applicable to military purposes, police purposes, rescue purposes, and is also applicable to wireless communications used in home or office.

However, since wireless nodes are limited in their transmission ranges on the point-to-point wireless network, the respective nodes should perform a function that forwards data and also have a function which routes forwarding routes. Also, the wireless network should newly set forwarding routes according to movements of the respective nodes, unlike fixed networks. Furthermore, as requirements for QoS (Quality of Service) become higher, a wireless network satisfying QoS requirements such as delay, transmission capacity, jitter, etc., regardless of movements of respective nodes, is necessary.

To provide QoS in such a wireless network communicating via the point-to-point network, a related art routing protocol uses an In-band signaling method. This In-band signaling method is a method in which a transmitting node sets a forwarding route using a packet including QoS requirements in its IP header, and a receiving node reports the QoS states of nodes existing on the forwarding route to the transmitting node. If the transmitting node receives from the receiving node a message indicating that no node on the forwarding route satisfies the QoS requirements, the transmitting node searches for a new route satisfying the QoS requirements and newly sets a forwarding route. As a result, due to such repeated searches for a forwarding route, discontinuity exists in a packet transmission service and accordingly end-to-end delay is caused.

SUMMARY OF THE INVENTION

The present invention provides a method and wireless communication system for providing Quality of Service (QoS), without repeated searches for a forwarding route in a case where QoS requirements are not satisfied, in a wireless network communicating via a point-to-point network.

According to an aspect of the present invention, there is provided a method for providing QoS in a wireless network communicating through a point-to-point network, the method comprising: (a) at least one of intermediate nodes and a receiving node, selecting at least one QoS management node among different nodes within a predetermined range which are not included on a forwarding route, the forwarding route reaching from a transmitting node to the receiving node via at least one intermediate node satisfying QoS requirements; (b) the selected QoS management node, managing QoS management information of the different nodes which are not included on the forwarding route; and (c) the QoS management node, changing the forwarding route on the basis of the QoS management information so that the changed forwarding route passes through a different node satisfying the QoS requirements, if it is expected that at least one intermediate node existing on the forwarding route will not satisfy the QoS requirements.

It is preferable that (a) comprises: (a1) at least one of the intermediate nodes and the receiving node on the forwarding route, analyzing expected lifetime information of the different nodes which are not included on the forwarding route, the expected lifetime information received when the forwarding route is set; (a2) at least one of the intermediate nodes and the receiving node on the forwarding route, selecting as the QoS management node a node with a longest expected lifetime among the different nodes; and (a3) at least one of the intermediate nodes and the receiving node on the forwarding route, notifying the node selected as the QoS management node that the node has been selected as a QoS management node.

It is preferable that (b) comprising: (b1) the selected QoS management node, requesting QoS information to the different nodes which are not included on the forwarding route; and (b2) receiving QoS information of the different nodes which are not included on the forwarding route, and updating QoS management information including a list of nodes satisfying QoS requirements and QoS information of the respective nodes. It is also preferable that (b) further comprises: (b3) the QoS management node, broadcasting a QoS information request to search for a new node which is not included on the forwarding route, if no node among the different nodes receiving the QoS information satisfies the QoS requirements; (b4) updating the QoS management information if QoS information of the new node which is not included on the forwarding route is received; and (b5) the QoS management node, exchanging the QoS management information with a different QoS management node and updating the QoS management information.

It is preferable that wherein (c) comprises: (c1) the at least one intermediate node existing on the forwarding route, requesting a route change to the QoS management node if its QoS information exceeds a predetermined threshold value; (c2) the QoS management node receiving the route change request, selecting a node among the different nodes which are not included on the forwarding route, which optimally satisfies QoS requirements, on the basis of the QoS management information; and (c3) the QoS management node, changing the forwarding route so that the changed forwarding route passes through the selected node.

According to another aspect of the present invention, there is provided a wireless communication system communicating through a point-to-point network, which provides QoS, the wireless communication system comprising: a transmitting node, which searches for a forwarding route satisfying QoS requirements and communicates with a receiving node; a receiving node, which searches for the forwarding route satisfying the QoS requirements, communicates with a transmitting node, and selects at least one management node among different nodes which are not included on the forwarding route; at least one intermediate node, which exists on a forwarding route from the transmitting node to the receiving node as a node satisfying the QoS requirements, and selects at least one QoS management node among different nodes which are not included in the forwarding route; and at least one QoS management node, the intermediate node selecting the QoS management node among the different nodes which are not included on the forwarding route, which manages QoS management information of the different nodes, and changes the forwarding route on the basis of the QoS management information, so that the changed forwarding route passes through a different node satisfying the QoS requirements, if it is expected that the intermediate node does not satisfy the QoS requirements.

According to still another aspect of the present invention, there is provided a transmitting node of a wireless communication system communicating via a point-to-point network, the transmitting node comprising: a route setting unit, which searches for a forwarding route which reaches from the transmitting node to a receiving node via an intermediate node satisfying QoS requirements; and a data communication unit, which forwards data to the receiving node through the forwarding route set by the route setting unit.

According to still another aspect of the present invention, there is provided a receiving node of a wireless communication system communicating through a point-to-point network, which provides QoS, the receiving node comprising: a route setting unit, which sets a forwarding route which reaches from a transmitting node to the receiving node via at least one intermediate node satisfying the QoS requirements; and a QoS manager selection unit, which selects at least one QoS management node among different nodes which are not included on the forwarding route.

According to further aspect of the present invention, there is provided at least one intermediate node of a wireless communication system communicating through a point-to-point network, which provides QoS, the intermediate node comprising: a QoS manager selection unit, which selects at least one QoS management node among different nodes which are not included on a forwarding route, the forwarding route reaching from a transmitting node to a receiving node via at least one intermediate node satisfying QoS requirements; and a route change unit, which requests a route change to the QoS management node if it is expected that its QoS information does not satisfy the QoS requirements.

According to further more aspect of the present invention, there is provided at least one QoS management node of a wireless communication system communicating through a point-to-point network, which provides QoS, the QoS management node comprising: a QoS information management unit, which manages QoS information of other nodes which are not included on a forwarding route, the forwarding route reaching from a transmitting node to a receiving node via at least one intermediate node satisfying QoS requirements; and a route change unit, which changes the forwarding route on the basis of the QoS management information so that the changed forwarding route passes through a different node satisfying the QoS requirement, if it is expected that at least one intermediate node existing on the forwarding route does not satisfy the QoS requirements.

BRIEF DESCRIPTION OF THE DRAWINGS

The above and other features and advantages of the present invention will become more apparent by describing in detail exemplary embodiments thereof with reference to the attached drawings in which:

FIG. 2 is a block diagram of a node constructing the wireless communication system for providing QoS, according to an embodiment of the present invention;

FIG. 5 is a diagram for explaining the route setting process in the wireless communication system for providing QoS;

FIGS. 6a and 6b illustrate formats of a route request message and a route response message used for setting a route;

DETAILED DESCRIPTION OF THE INVENTION

Hereinafter, embodiments of the present invention will be described in detail with reference to the appended drawings.

Figure 1:
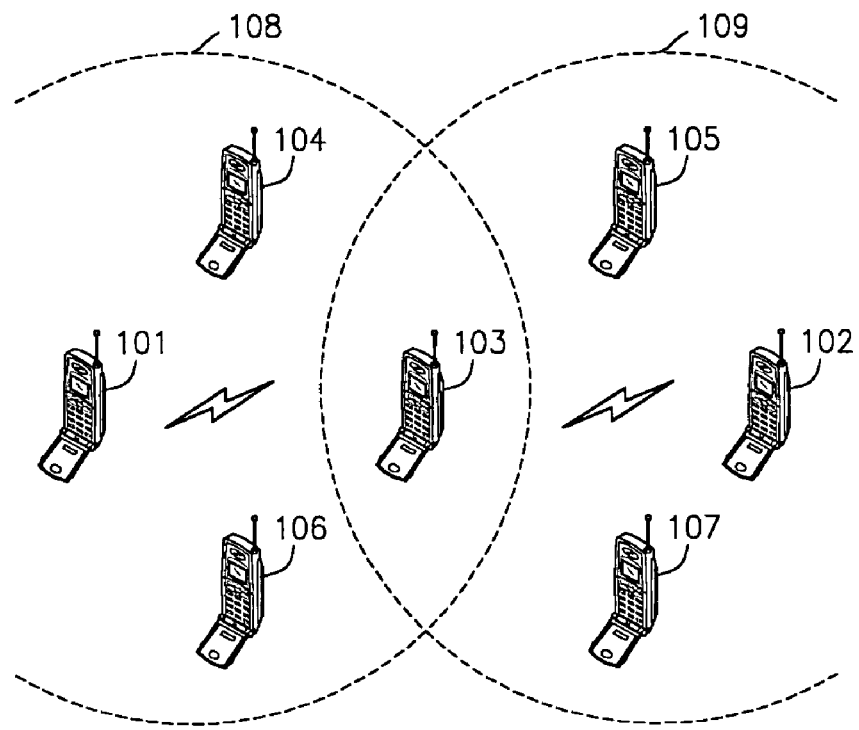
FIG. 1 illustrates an example of a wireless communication system for providing Quality of Service (QoS), according to the present invention.

FIG. 1 illustrates a wireless communication system for providing QoS, according to an embodiment of the present invention.

Referring to FIG. 1, the wireless communication system according to the present invention comprises a transmitting node 101, a receiving node 102, an intermediate node 103, and QoS management nodes 106 and 107, wherein the QoS management nodes 106 and 107 are selected among nodes 104 through 107 within a predetermined range which are not included on a forwarding route. The predetermined range is a communication range of each node in the wireless communication network and generally is 1-hop. In FIG. 1, each of areas 108 and 109 denoted by dotted lines represent 1-hop, i.e., a communication range in which a wireless node can transmit and receive packets. Due to such communication range limitation, an intermediate node that performs routing of packets is necessary.

The transmitting node 101 searches for a forwarding route satisfying QoS requirements, which reaches the receiving node 102 via an intermediate node satisfying the QoS requirements. Then, the transmitting node 101 forwards data to the receiving node 102 through the forwarding route.

The receiving node 102 sets a forwarding route satisfying QoS requirements, which reaches the transmitting node 101 via an intermediate node satisfying the QoS requirements. The receiving node 102 selects the QoS management nodes 106 and 107, among the nodes 104 through 107 within the predetermined range which are not included on the forwarding route.

An intermediate node 103 selects QoS management nodes 106 and 107 among different nodes within a predetermined range which are not included on the forwarding route. If it is expected that the intermediate node 103 will not satisfy the QoS requirements, the intermediate node 103 requests a route change to the QoS management nodes, so that the forwarding route passes through a different node satisfying the QoS requirements.

The QoS management nodes 106 and 107 manage QoS management information of the different nodes within the predetermined range which are not included on the forwarding route. If the QoS management nodes 106 and 107 receive the route change request from the intermediate node 103, the QoS management nodes 106 and 107 change the forwarding route, on the basis of the QoS management information, so that the changed forwarding route passes through a different node satisfying QoS requirements.

FIG. 2 is a block diagram of a node constructing the wireless communication system for providing QoS, according to an embodiment of the present invention.

Referring to FIG. 2, each node constructing the wireless communication system according to the present invention comprises a route setting unit 201, a QoS manager selector 202, a QoS information management unit 203, a route change unit 204, a data communication unit 205, a message processing unit 206, and a communication interface 207.

The route setting unit 201 searches for a forwarding route satisfying QoS requirements, which reaches from the transmitting node 101 to the receiving node via the intermediate node 103 satisfying the QoS requirements.

The QoS manager selector 202 selects a QoS management node among different nodes within a predetermined range which are not included on the forwarding route.

The QoS information management unit 203 manages QoS management information of different nodes within a predetermined range which are not included on the forwarding route.

The route change unit 204 changes the forwarding route on the basis of the QoS management information, so that the changed forwarding route passes through a different node satisfying the QoS requirements, if it is expected that an intermediate node existing on the forwarding route will not satisfy the QoS requirements.

The data communication unit 205 forwards data through the set forwarding route.

The message processing unit 206 processes protocol messages transmitted/received to/from the route setting unit 201, the QoS manager selector 202, the QoS information management unit 203, the route change unit 204, and the data communication unit 205.

The communication interface 207 transmits the protocol messages processed by the message processing unit 206 to different nodes.

The route setting unit 201, the QoS manager selector 202, the QoS information management unit 203, the route change unit 204, the data communication unit 205, the message processing unit 206, and the communication interface 207 can be implemented, respectively, by software or hardware, and also can be implemented by one program or sub-routines. Since the wireless network according to the present invention is changed according to movements of nodes, only corresponding components among the above-mentioned components in a node can be activated according to whether the node acts as which node among the transmitting node, the receiving node, the intermediate node, and the QoS management node every moment. That is, each node includes all the above-mentioned components, but only the corresponding components among the components can be activated according to a role of the node in variable point to point network.

Hereinafter, combinations of the activated components among the components are described.

Figure 3A:
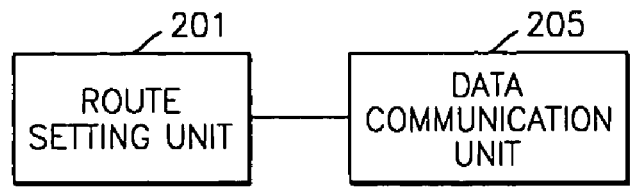
FIGS. 3a through 3d are block diagrams of a transmitting node, a receiving node, an intermediate node, and a QoS management node, respectively, which construct the wireless communication system for providing QoS.

FIG. 3a is a block diagram of the transmitting node 101 constructing the wireless communication system that provides QoS.

Referring to FIG. 3a, in the transmitting node 101, a route setting unit 201 which searches for a forwarding route satisfying QoS requirements and a data communication unit 205 which forwards data to the receiving node 102 through a set forwarding route, are activated.

Figure 3B:
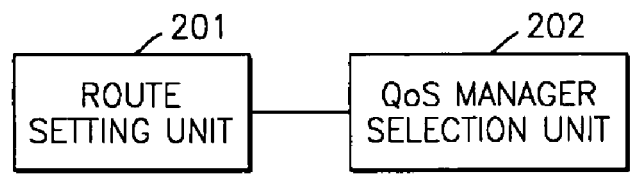

FIG. 3b is a block diagram of a receiving node 102 constructing the wireless communication system that provides QoS.

Referring to FIG. 3b, in the receiving node 102, a route setting unit 201 which sets a forwarding route satisfying QoS requirements, and a QoS manager selector (selection unit) 202 which selects QoS management nodes 106 and 107 among nodes 104 through 107 within a predetermined range which are not included on the forwarding route, are activated.

Figure 3C:
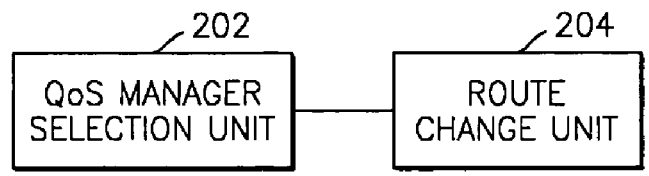

FIG. 3c is a block diagram of an intermediate node 103 constructing a wireless communication system that provides QoS.

Referring to FIG. 3c, in the intermediate node 103, a QoS manager selector 202 which selects QoS management nodes 106 and 107 among different nodes within a predetermined range which are not included on the set forwarding route, and a route change unit 204 which requests a route change to the QoS management nodes so that the forwarding route passes through a different node satisfying QoS requirements if it is expected that the intermediate node 103 will not satisfy the QoS requirements, are activated.

Figure 3D:
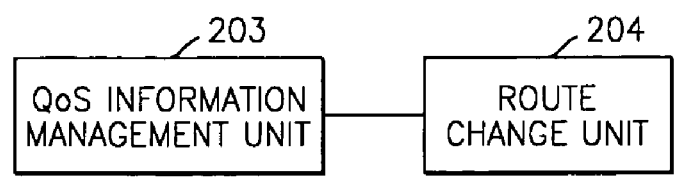

FIG. 3d is a block diagram of a QoS management node 106 or 107 constructing the wireless communication system that provides QoS.

Referring to FIG. 3d, in the QoS management node 106 or 107, a QoS information management unit 203 which manages management information of different nodes within a predetermined range which are not included on the set forwarding route, and a route change unit 204 which changes the forwarding route on the basis of the QoS management information so that the changed forwarding route passes through a different node satisfying QoS requirements, are activated.

In the wireless network communicating via the point-to-point network, according to the present invention as described above, a method for providing QoS is described below.

Figure 4A:
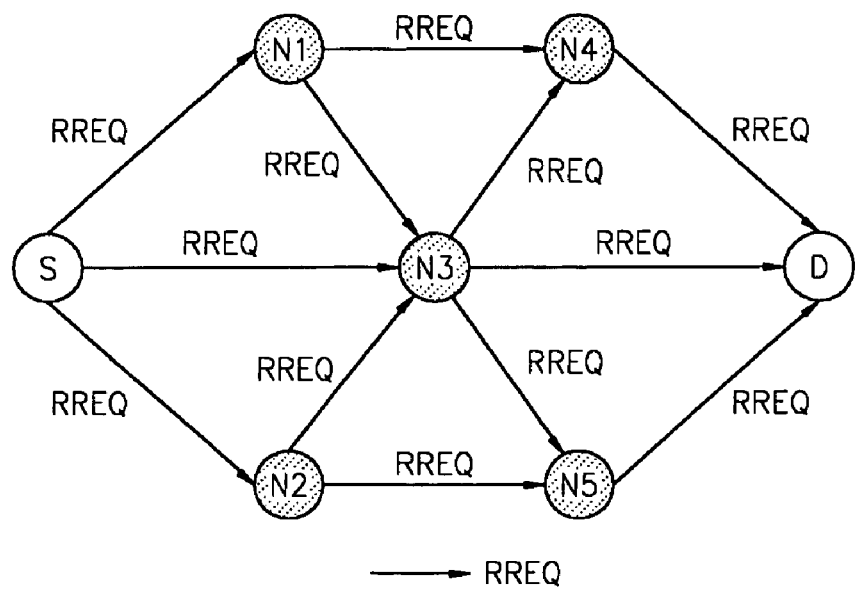
FIGS. 4a and 4b are views for explaining a process for setting a route in the wireless communication system for providing QoS.
Figure 4B:
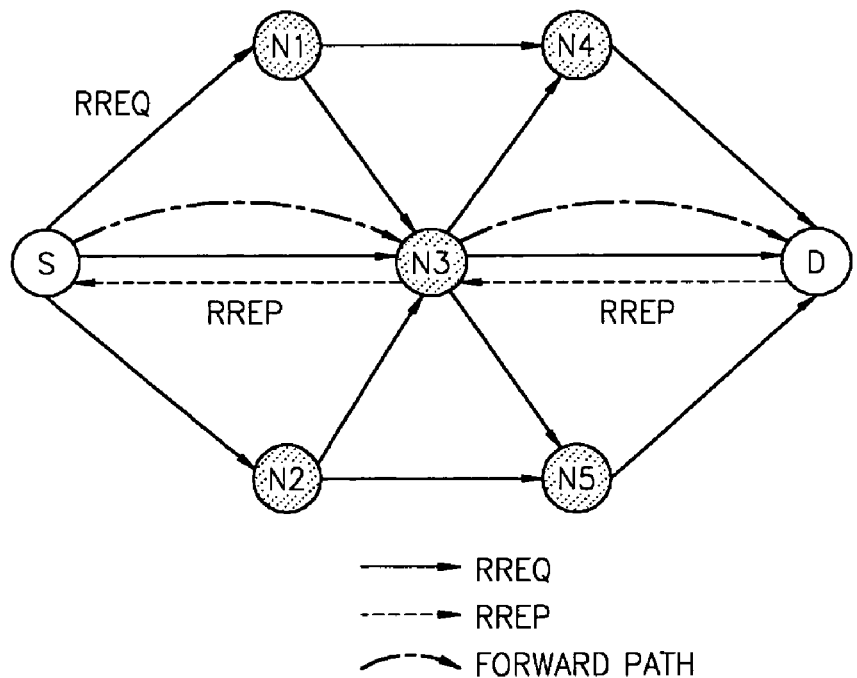

FIGS. 4a and 4b are views for explaining a route setting process of a wireless communication system for providing QoS.

Referring to FIG. 4a, a transmitting node S broadcasts a route request message RREQ to search for a forwarding route satisfying QoS requirements. The route request message includes expected lifetime information and QoS requirements information for a transmitting node. The QoS requirement information may also include information for maximal values, minimal values, or weights of delay, jitter, throughput, transmission power, remaining power, etc. The format of the route request message RREQ will be described later.

The transmitting node, i.e., the source node S transmits the route request messages RREQ to nodes N1 and N2 within 1-hop therefrom. The node N1 transmits the route request message to nodes N3 and N4, and the node N2 transmits the route request messages to nodes N3 and N5. The nodes N4 and N5 transmit the route request message to a receiving node D. If the respective nodes receive a plurality of route request messages, the respective nodes transmit only a first received route request message which satisfies QoS requirements. Once receiving the route request message, the receiving node D does no longer transmit the route request message.

The respective nodes store the expected lifetime information included in the route request message. The stored expected lifetime information is used as a basis for selecting a QoS management node.

Referring to FIG. 4b, the receiving node D transmits a route response message RREP to the node that has transmitted the first received route request message satisfying the QoS requirements. This process is repeated until the route response message reaches the transmission node S. If the route response message reaches the transmission node S, the route in which the route response message is transmitted is set as a forwarding route and a node existing on the forwarding route is set as intermediate nodes. That is, if the route response message is transmitted in the order of D→N3→S, a forwarding route of S→N3→D is set. Thus, the node N3 becomes an intermediate node on the forwarding route.

FIG. 5 is a diagram for explaining a route setting process of the wireless communication system that provides QoS.

Referring to FIG. 5, the transmitting node broadcasts route request messages RREQ including expected lifetime information and QoS requirements information, to different nodes within 1-hop therefrom (step 1). A node that received the route request message stores the expected lifetime information included in the route request message (step 2), and broadcasts the route request message to a different node within 1-hop therefrom (step 3). The node that received the route request message repeats above steps 2 and 3 until the route request message reaches the receiving node (steps 4 and 5). The receiving node that received the route request message transmits a route response message RREP to a node which has first transmitted the route request message and which satisfies QoS requirements (step 6). Likewise, this process is repeated until the route response message reaches the transmitting node (steps 7 and 8). A route in which the route response message is transmitted becomes a forwarding route, and nodes existing on the forwarding route becomes intermediate nodes.

Figure 6B:
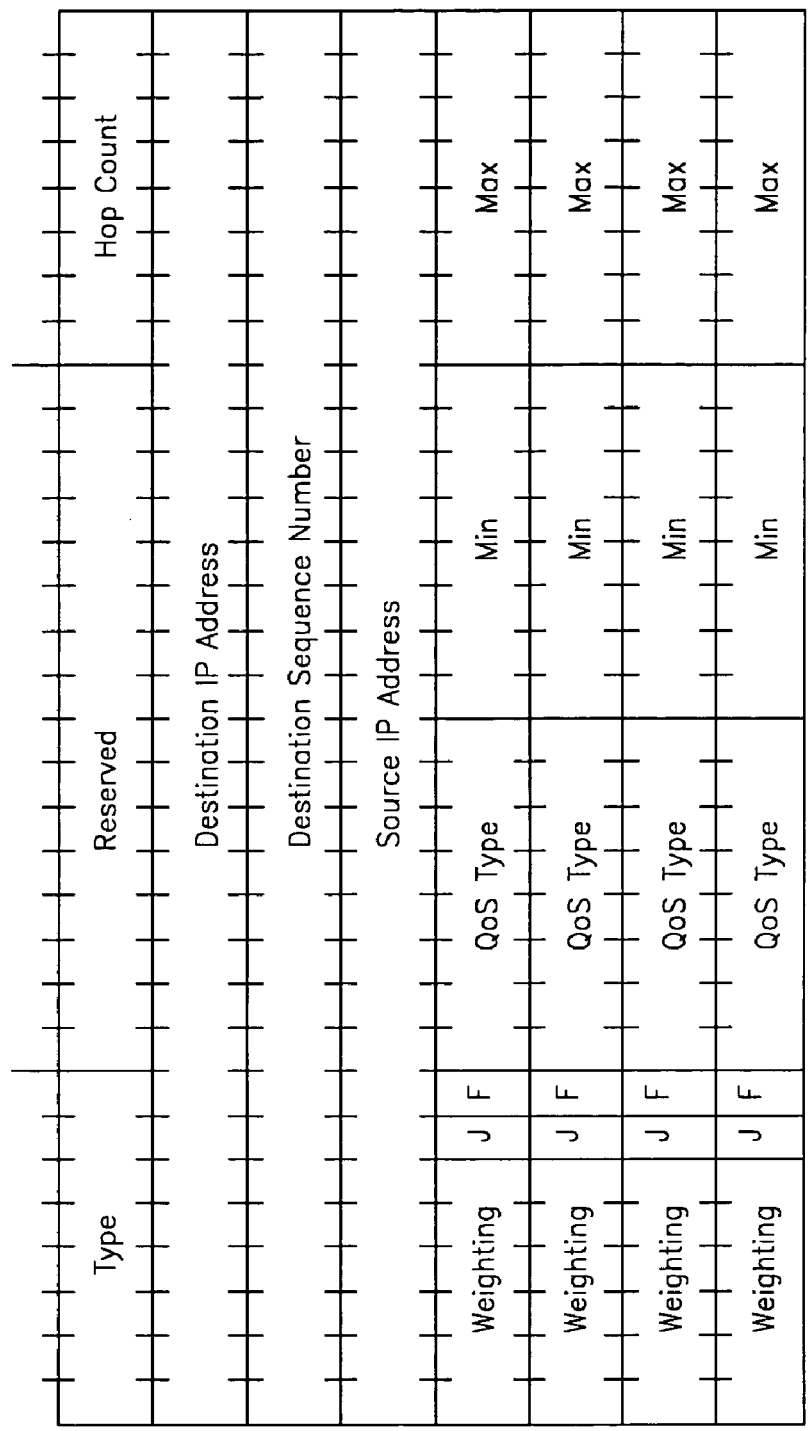

FIGS. 6a and 6b are examples of formats of the route request message and the route response message for setting a route, respectively.

Referring to FIG. 6a, the route request message RREQ includes expected lifetime information and QoS requirements information.

The expected lifetime information is calculated on the basis of a remaining power on each node, according to Equation 1 below.

$$E = P/M \quad (1)$$

wherein, E is a value for the expected lifetime information, P is a present remaining power of a corresponding node, M is a numeral of a transmitting/receiving message, and if calculation of the numeral of the transmitting/receiving message is not possible at the time, the present remaining power of the corresponding node is calculated quantitatively. A QoS management node is selected according to the calculated expected life time information E.

The QoS requirements information is a reference value of QoS which a transmitting node requests from an intermediate node and a receiving node. The QoS requirements information can include information such as maximal values, minimal values, or weights of delay, jitter, throughput, transmission power, remaining power, etc. The route request message may further include message type or routing path information, etc.

Referring to FIG. 6b, the route response message RREQ can include routing path information and QoS requirements information, and include a flag area (J/F) indicating whether each node satisfies QoS requirements. The message formats shown in FIGS. 6a and 6b are only exemplary and various changes in the formats may be made.

Figure 7A:
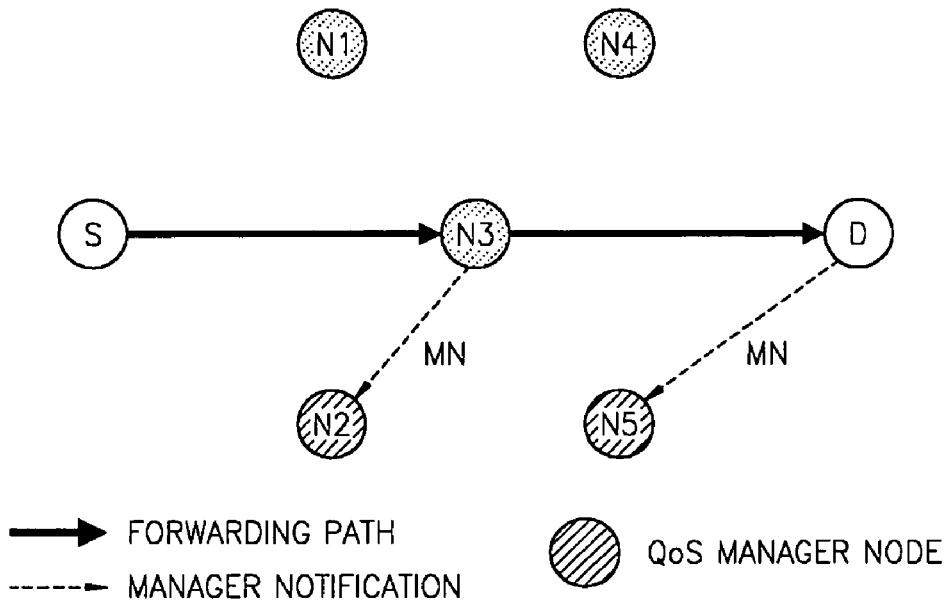
FIGS. 7a through 7c are views for explaining a process for providing QoS, according to an embodiment of the present invention.
Figure 7B:
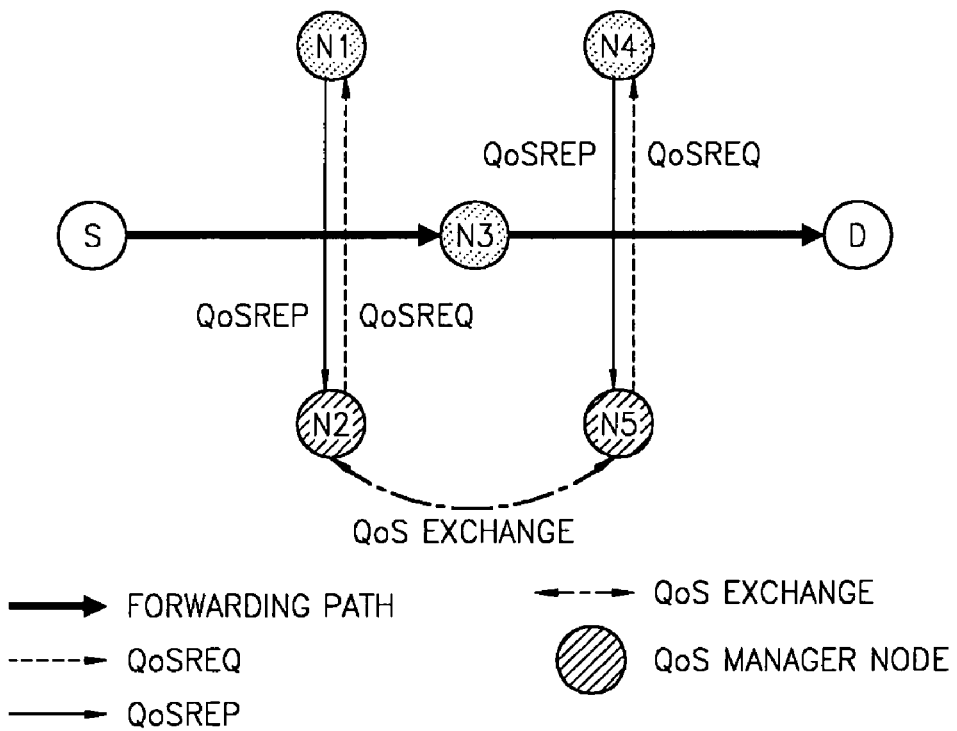
Figure 7C:
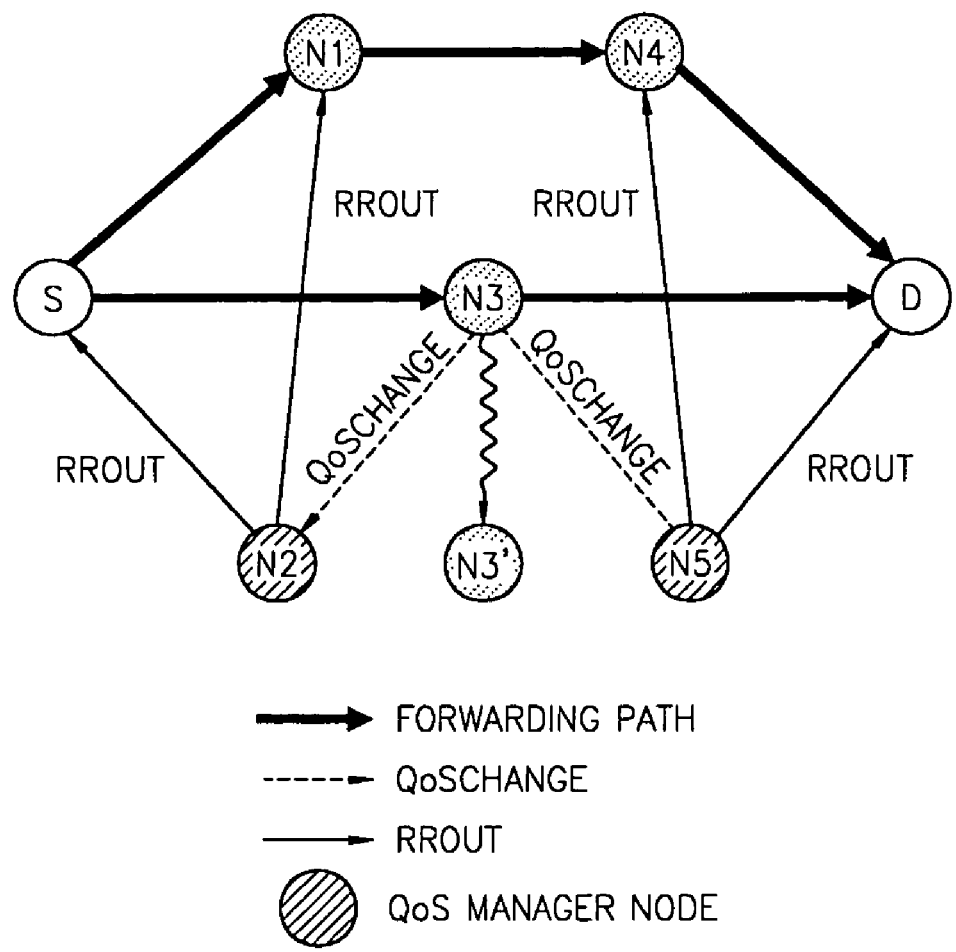

FIGS. 7a through 7c are views for explaining a process of providing QoS, according to an embodiment of the present invention.

FIG. 7a shows a process for selecting QoS management nodes. Referring to FIG. 7a, in a forwarding route which reaches from a transmitting node S to a receiving node D via an intermediate node N3 which satisfies QoS requirements, the intermediate node N3 or the receiving node D selects QoS management nodes N2 and N5, among different nodes N1, N2, N4, and N5 within 1-hop which are not included on the forwarding route, and transmits to the selected QoS management nodes N2 and N5, a manager notification message MN for notifying that the nodes are selected as QoS management nodes. If the transmitting node reaches the receiving node via n hops, QoS management nodes of maximal n can be selected.

FIG. 7b shows a process in which a selected QoS manager manages QoS information. Referring to FIG. 7b, the selected QoS management nodes N2 and N5 manage QoS information of the different nodes N1 and N4 within 1-hop which are not included on the forwarding route. The selected QoS management nodes N2 and N5 transmits a QoS information request message QoSREQ which requires QoS information to the different nodes N1 and N4 within 1-hop which are not included on the forwarding route, receives a QoS information response message QoSREP from the different nodes N1 and N4, and updates QoS management information. The QoS management information stores QoS states of peripheral nodes with 1-hop from the QoS management node. The QoS management information is updated by the QoS information request message QoSREQ and the QoS information response message QoSREP. The QoS management information stores QoS information of the peripheral nodes which are not included on the forwarding route, according to their priorities. Accordingly, if the intermediate node on the forwarding route does not satisfy the QoS requirements, the forwarding route can be changed on the basis of the QoS management information, without a separate search for a new route (as shown in FIG. 5), so that the changed forwarding route passes through a node with the highest priority which satisfies the QoS requirements.

Also, if the QoS management nodes receive the QoS information response message but no node satisfies the QoS requirements, the QoS management nodes N2 and N5 broadcast a QoS information request message QOSINVITE (QoS invite message), receives a QoS information response message from a node newly found, and updates the QoS management information. The QoS management nodes should manage at least one node satisfying the QoS requirements. The reason is because the QoS management node should change the forwarding route into a different route when present intermediate nodes cannot no longer participate in the forwarding of data. By exchanging the QoS management information with different QoS management nodes, the QoS management node can receive QoS information of a node newly found.

FIG. 7c is a view for explaining a process for changing a route in the case where an intermediate node does not satisfy QoS requirements. In FIG. 7c, in a case where an intermediate node N3 on a forwarding route is moved to a location of N3' or in a case where route discontinuity or a situation which does not satisfy the QoS requirements occurs, a process for changing a route is illustrated. The intermediate node N3 on the forwarding route transmits a route change message QOSCHANGE (QoS change message) to QoS management nodes N2 and N5 requests a route change, if QoS information of the intermediate node N3 exceeds a predetermined threshold value. QoS management nodes N2 and N5 that received the route change message selects nodes N1 and N4, which optimally satisfy the QoS requirements, among different nodes that are not included on the forwarding route, on the basis of QoS management information, and changes the forwarding route so that the changed forwarding route passes through the selected nodes. That is, the QoS management nodes transmit reroute messages RROUT including route routing information to the nodes N1 and N4 located before and after the intermediate node, so that they pass via the newly selected nodes.

Hereinafter, the process for providing QoS as described with reference to FIGS. 7a through 7c is summarized.

Figure 8:
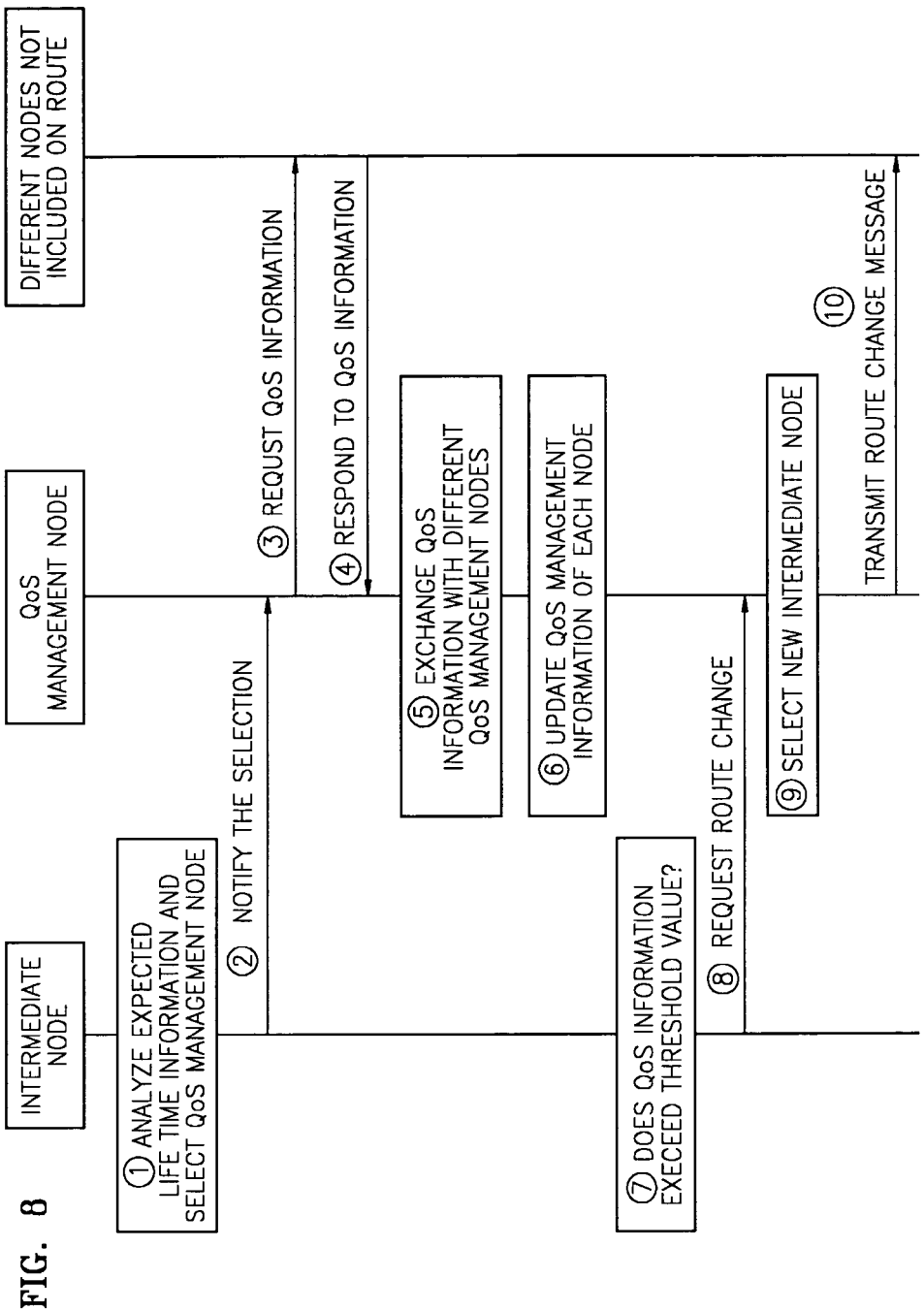
FIG. 8 is a diagram for explaining the process for providing QoS, according to an embodiment of the present invention.

FIG. 8 is a diagram for explaining the process for providing QoS, according to an embodiment of the present invention.

Referring to FIG. 8, if a forwarding route is set, an intermediate node on the forwarding route selects a node having the longest expected lifetime among different nodes which are not included within 1-hop therefrom, sets the selected node as a QoS management node (step 1), and notifies the set node that the node is set as QoS management node (step 2).

The Qos management node requests QoS information from the different nodes within 1-hop which are not included on the forwarding route (step 3). Then, the QoS management node receives QoS information (step 4) or exchanges QoS management information with different QoS management nodes (step 5), thereby updating the QoS management information for managing QoS states of the peripheral nodes (step 6).

Meanwhile, the intermediate node on the forwarding route requests a route change to the QoS management node (step 8), if its QoS information exceeds a predetermined threshold value and accordingly it is expected that the intermediate node will not satisfy the QoS requirements (step 7).

The QoS management node receiving the route change selects a different node which is not included on the forwarding route and which optimally satisfies the QoS requirements, on the basis of the QoS management information storing the QoS states of the peripheral nodes managed by the QoS management node (step 9), and changes the forwarding route so that the changed forwarding route passes through the selected node as a new intermediate node (step 10).

Figure 9:
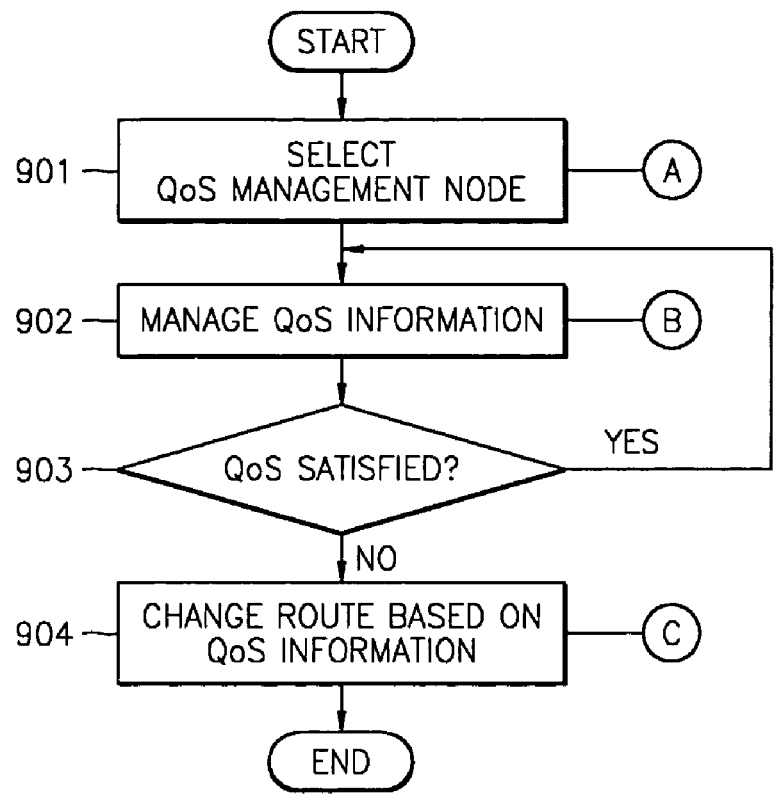
FIG. 9 is a flow chart illustrating a method for providing QoS, according to an embodiment of the present invention.

FIG. 9 is a flow chart illustrating a method of providing QoS, according to an embodiment of the present invention.

Referring to FIG. 9, if a forwarding route is set, an intermediate node and a receiving node on the forwarding route select QoS management nodes for managing QoS states of their peripheral nodes (step 901). The selected QoS management nodes perceives the QoS states of the peripheral nodes and performs QoS management such as managing a substitution node which satisfies QoS requirements (step 902). If it is expected that an intermediate node on a present forwarding route will not satisfy the QoS requirements (step 903), the QoS management node changes the forwarding route based on QoS management information so that the changed forwarding route passes through the substitution node (step 904).

Therefore, it is possible to change a present forwarding route into a substitution route immediately without searching for and selecting a new forwarding route, even though the present forwarding route does not satisfy QoS requirements.

Accordingly, although QoS states are changed due to movements of nodes, etc., end-to-end delay or discontinuity can be reduced.

Figure 10A:
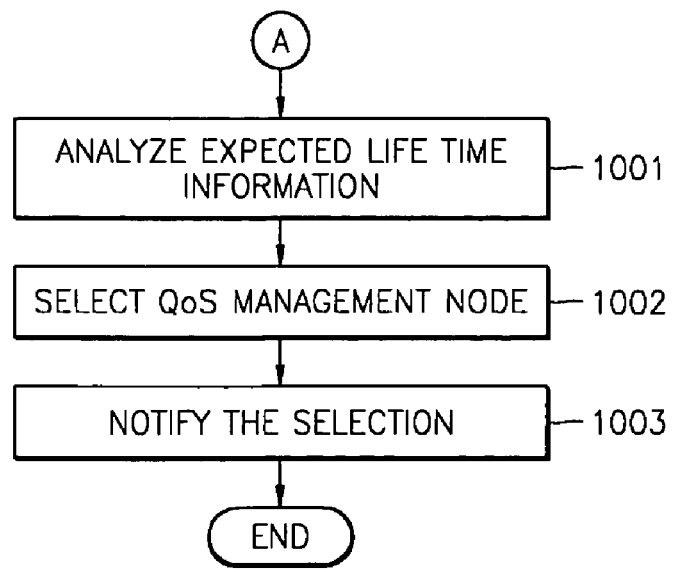
FIG. 10a is a flow chart illustrating a method A for selecting a QoS management node, according to an embodiment of the present invention.

FIG. 10a is a flow chart illustrating a method A for selecting QoS management nodes.

Referring to FIG. 10a, an intermediate node and a receiving node analyze expected lifetime information included in a route request message received when a route is set (step 1001), selects a node with the longest expected lifetime, i.e., a node with the most remaining power, as a QoS management node (step 1002), and transmits a manager selection message MN to the corresponding node (step 1003) to notify of the selection.

Figure 10B:
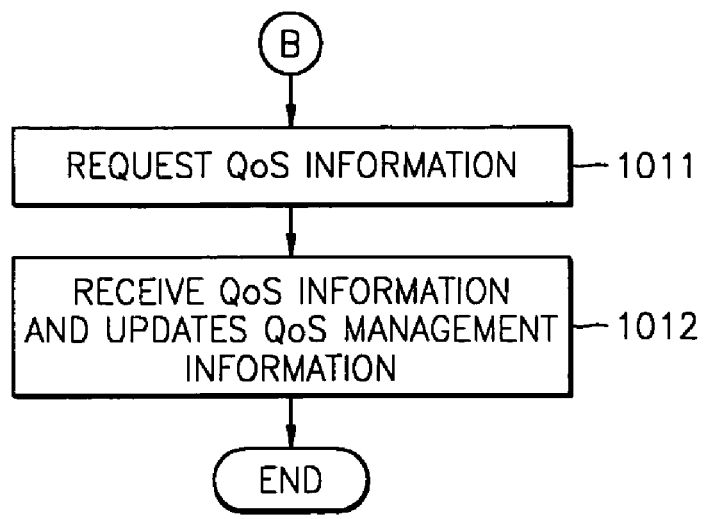
FIG. 10b is a flow chart illustrating a method B for managing QoS information, according to an embodiment of the present invention.

FIG. 10b is a flow chart illustrating a method B for managing QoS information.

Referring to FIG. 10b, the selected QoS management node requests QoS information from different nodes within 1-hop therefrom which are not included on the forwarding route (step 1011), receives QoS information of the respective nodes, and updates QoS management information (step 1012). The QoS management information lists peripheral nodes that satisfy QoS requirements in order, and includes and manages present QoS information of the respective nodes.

Figure 10C:
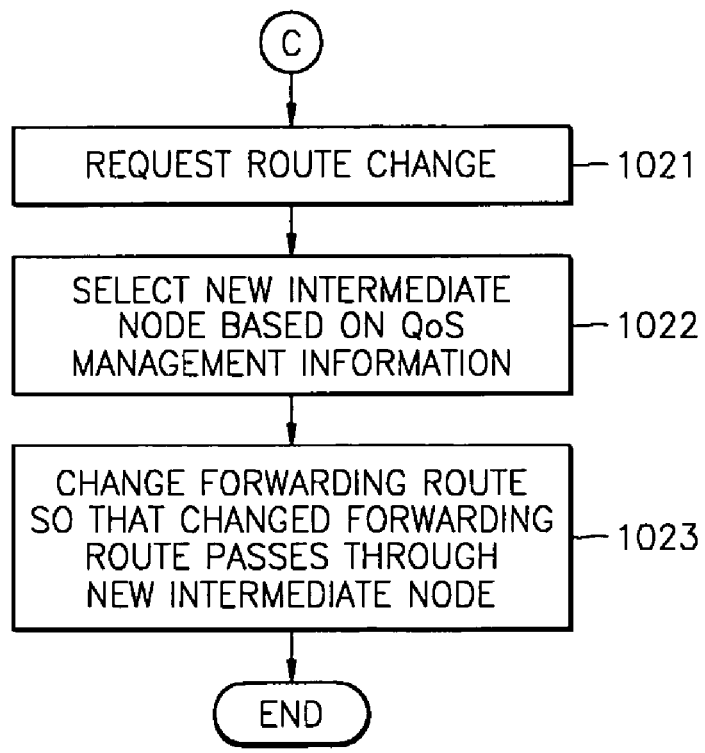
FIG. 10c is a flow chart illustrating a method C for changing a route when QoS requirements are not satisfied, according to an embodiment of the present invention.

FIG. 10c is a flow chart illustrating a method C for changing a forwarding route when the forwarding route does not satisfy QoS requirements.

Referring to FIG. 10c, in a case where QoS information of a present intermediate node exceeds a predetermined threshold value and it is expected that the intermediate node will not satisfy QoS requirements, the corresponding intermediate node requests a route change to a QoS management node (step 1021). The QoS management node receiving the route change searches for a node which optimally satisfies the QoS requirements, on the basis of the QoS management information managed by the QoS management node, selects the searched node as a new intermediate node (step 1022), and changes the forwarding route so that the changed forwarding route passes through the new intermediate node (step 1023).

Hereinafter, there are provided test results that compare performances of a wireless communication system which selects a QoS management node and provides QoS, according to an embodiment of the present invention, with those of a wireless communication system in which no QoS management node exists.

Figure 11A:
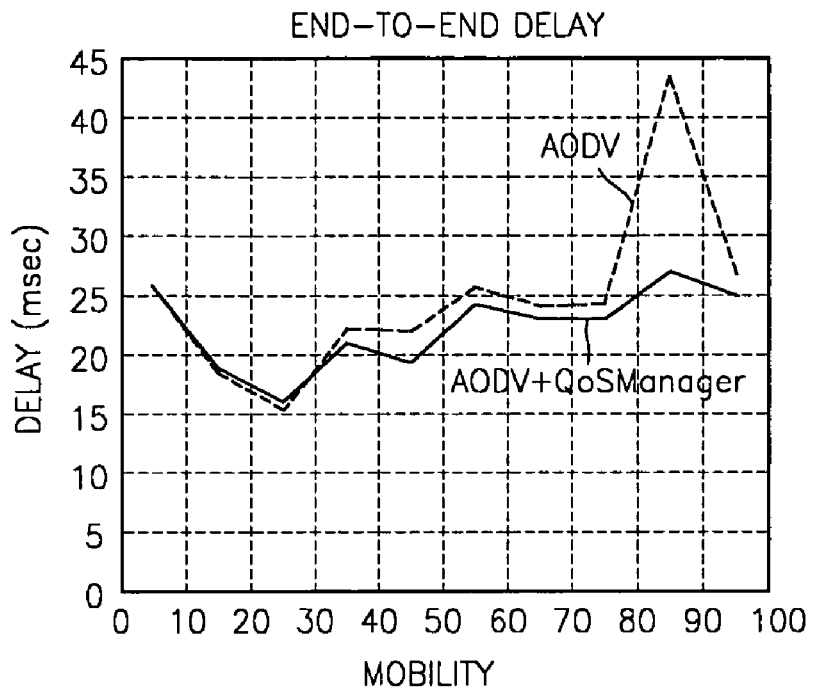
FIGS. 11a and 11b are simulation test results showing performances of a wireless communication system using the method for providing QoS according to the present invention.
Figure 11B:
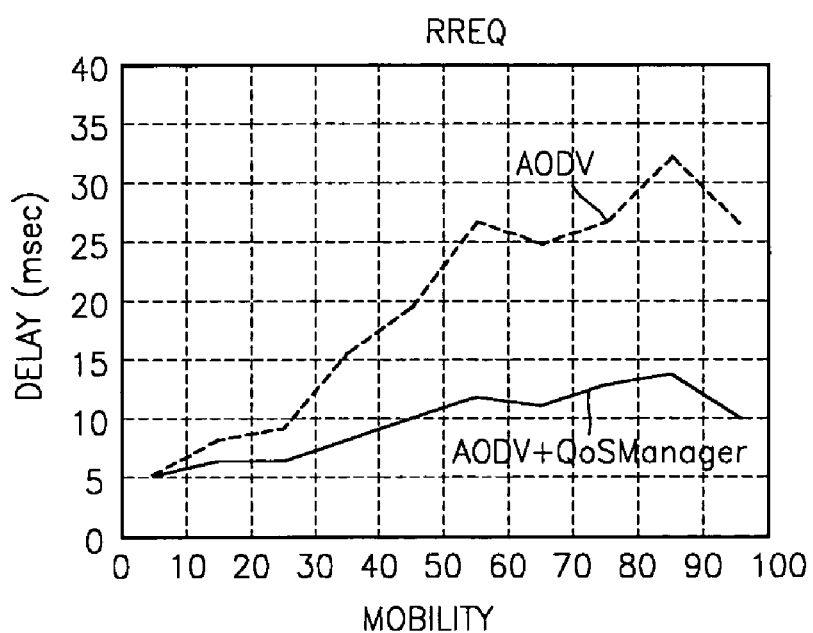

FIGS. 11a and 11b are plots showing simulation results of performances of a wireless communication system using the method for providing QoS according to the present invention. The simulation tests have performed using GloMoSim Visualization Tool version 2.03 developed by UCLA Computer Science LAB. An Ad Hoc On Demand Distance Vector (AODV) protocol is used as a routing protocol. The AODV protocol selects QoS management nodes. The AODV is modeled on the basis of draft-ietf-manet-aodv-03.txt of IETF.

FIG. 11a shows comparison of end-to-end delays in both a case that only AODV protocol is used and a case that the AODV protocol is used with a QoS manager. In the both cases, as mobility become greater, the end-to-end delays increase. However, by selecting a QoS management node (AODV+QoS Manager), the increase rate of the end-to-end delay is relatively reduced. The reason is because the related art case using the AODV protocol should newly search for a route when QoS requirements are not satisfied, while the present invention can change the route based on information managed by the QoS management node without a separate route searching process. That is, real-time transmission is ensured, by selecting a QoS management node for a real-time data packet and managing a route, in an Ad-Hoc environment in which a route is set as necessary.

Referring to FIG. 11b, the number of route request messages for setting a route is shown. As mobility becomes greater, link loss is caused, thereby gradually increasing the number of the route request messages for setting the route. However, according to the present invention (AODV+QoS Manager), the number of the route request messages is reduced by 50% or more when compared to the related art method using only the AODV protocol. That is, according to the present invention, since a QoS management node changes the route in advance before link loss is caused in the case where it is expected that QoS requirements will not be satisfied, cases where route request messages should be newly transmitted due to link loss infrequently occur. Therefore, it is possible to reduce end-to-end delay and link loss, i.e., route discontinuity and efficiently maintain a route capable of providing QoS, by using QoS management nodes.

As described above, according to the present invention, it is possible to reduce end-to-end delay and route discontinuity in a wireless communication that provides QoS. That is, it is possible to reduce end-to-end and route discontinuity, by selecting QoS management nodes, managing QoS states of peripheral nodes, and changing a route using QoS information without separate routing in a case where it is expected that QoS requirements will not be satisfied.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for providing QoS in a wireless network communicating through a point-to-point network, the method comprising:
   (a) at least one of intermediate nodes and a receiving node, selecting at least one QoS management node among different nodes within a predetermined range which are not included on a forwarding route, the forwarding route reaching from a transmitting node to the receiving node via at least one intermediate node satisfying QoS requirements;
   (b) the selected QoS management node, managing QoS management information of the different nodes which are not included on the forwarding route; and
   (c) the QoS management node, changing the forwarding route on the basis of the QoS management information so that the changed forwarding route passes through a different node satisfying the QoS requirements, if it is expected that at least one intermediate node existing on the forwarding route will not satisfy the QoS requirements,
   wherein (c) comprises:
   (c1) the at least one intermediate node existing on the forwarding route, requesting a route change to the QoS management node if its own QoS information exceeds a predetermined threshold value;
   (c2) the QoS management node receiving the route change request, selecting a node among the different nodes which are not included on the forwarding route, which optimally satisfy QoS requirements, on the basis of the QoS management information; and
   (c3) the QoS management node, changing the forwarding route so that the changed forgwarding route passes through the selected node.

2. The method of claim 1, wherein (a) comprises:
   (a1) at least one of the intermediate nodes and the receiving node on the forwarding route, analyzing expected lifetime information of the different nodes which are not included on the forwarding route, the expected lifetime information received when the forwarding route is set;
   (a2) at least one of the intermediate nodes and the receiving node on the forwarding route, selecting as the QoS management node a node with a longest expected lifetime among the different nodes; and
   (a3) at least one of the intermediate nodes and the receiving node on the forwarding route, notifying the node selected as the QoS management node that the node has been selected as a QoS management node.

3. The method of claim 2, wherein in (a1), the forwarding route is set in a manner that a route request message including the QoS requirements is broadcasted to all nodes within a predetermined range until a route request message has reached the receiving node, and the receiving node receiving the route request message transmits a route response message to the transmitting node via an intermediate node existing on a shortest route satisfying the QoS requirements.

4. The method of claim 2, wherein in (a1), the expected lifetime information is calculated based on a present remaining power and is calculated according to the equation:

$$E=P/M,$$

wherein E is a value for the expected lifetime information, P is a present remaining power of a corresponding node, M is a numeral of a transmitting/receiving message, and if calculation of the numeral of the transmitting/receiving message is not possible at the time, the present remaining power of the corresponding node is calculated quantitatively.

5. The method of claim 3, wherein the route request message includes expected lifetime information of a transmitting node and QoS requirements information, as a message for searching for a shortest route satisfying the QoS requirements.

6. The method of claim 3, wherein the route response message includes information for the shortest route satisfying QoS requirements and QoS information of the intermediate node existing on the shortest route, as a message for notifying a route searching result for setting a forwarding route to the transmitting node.

7. The method of claim 1, wherein (b) comprises:
   (b1) the selected QoS management node, requesting QoS information from the different nodes which are not included on the forwarding route; and
   (b2) receiving QoS information of the different nodes which are not included on the forwarding route, and updating the QoS management information including a list of nodes satisfying QoS requirements and QoS information of the respective nodes.

8. The method of claim 7, wherein (b) further comprises:
   (b3) the QoS management node, broadcasting a QoS information request to search for a new node which is not included on the forwarding route, if no node among the different nodes receiving the QoS information satisfies the QoS requirements; and
   (b4) updating the QoS management information if QoS information of the new node which is not included on the forwarding route is received.

9. The method of claim 8, wherein (b) further comprises:
   (b5) the QoS management node, exchanging the QoS management information with a different QoS management node and updating the QoS management information.

10. The method of claim 1, wherein the QoS requirements in (a) include at least one information among delay, jitter, throughput, transmission power, remaining power, maximal values and minimal values for the respective information, and set weights for the respective information.

11. A wireless communication system communicating through a point-to-point network, which provides QoS, the wireless communication system comprising:
a transmitting node, which searches for a forwarding route satisfying QoS requirements and communicates with a receiving node;
a receiving node, which searches for the forwarding route satisfying the QoS requirements, communicates with a transmitting node, and selects at least one QoS management node among different nodes which are not included on the forwarding route;
at least one intermediate node, which exists on a forwarding route from the transmitting node to the receiving node as a node satisfying the QoS requirements, and selects at least one QoS management node among different nodes which are not included in the forwarding route; and
at least one QoS management node, the intermediate node selecting the QoS management node among the different nodes which are not included on the forwarding route, which manages QoS management information of the different nodes, and changes the forwarding route on the basis of the QoS management information, so that the changed forwarding route passes through a different node satisfying the QoS requirements, if it is expected that the intermediate node does not satisfy the QoS requirements.

12. A transmitting node of a wireless communication system communicating via a point-to-point network, the transmitting node comprising:
a route setting unit, which searches for a forwarding route which reaches from the transmitting node to a receiving node via an intermediate node satisfying QoS requirements; and
a data communication unit, which forwards data to the receiving node through the forwarding route set by the route setting unit,
wherein the route setting unit broadcasts a route request message including the QoS requirements to all nodes within a predetermined range from the transmitting node to the receiving node, receives a route response message via at least one intennediate node on a shortest route satisfying the QoS requirements from the receiving node, and sets the forwarding route,
wherein the route request message is a message for searching for the shortest route satisfying the QoS requirements and includes expected lifetime information and QoS requirements information of a transmitting node.

13. A receiving node of a wireless communication system communicating through a point-to-point network, which provides QoS, the receiving node comprising:
a route setting unit, which sets a forwarding route which reaches from a transmitting node to the receiving node via at least one intermediate node satisfying the QoS requirements; and
a QoS manager selection unit, which selects at least one QoS management node among different nodes which are not included on the forwarding route,
wherein the QoS manager selection unit analyzes expected lifetime information of different nodes which are not included on the forwarding route, the expected lifetime information being received by transmission node existing on the forwarding route when the forwarding route is set; selects a node with a longest expected lifetime among the different nodes as a QoS management node; and notifies the selected node that the node is selected as a QoS management node.

14. The receiving node of claim 13, wherein the route setting unit receives a route request message including the QoS requirements, transmits a route response message to the transmitting node via at least one intermediate node existing on a shortest route satisfying the QoS requirements, and sets the forwarding route.

15. The receiving node of claim 14, wherein the route response message is a message for notifying a route searching result for setting the forwarding route to the transmitting node, and includes shortest forwarding route information satisfying the QoS requirements and QoS information of respective intermediate nodes on the forwarding route.

16. The receiving node of claim 13, wherein the expected lifetime information is calculated based on a present remaining power each remaining on the respective nodes, and is calculated according to the equation:

$$E=P/M,$$

wherein E is a value for the expected lifetime information, P is a present remaining power of a corresponding node, M is a numeral of a transmitting/receiving message, and if calculation of the numeral of the transmitting/receiving message is not possible at the time, the present remaining power of the corresponding node is calculated quantitatively.

17. At least one intermediate node of a wireless communication system communicating through a point-to-point network, which provides QoS, the intermediate node comprising:
a QoS manager selection unit, which selects at least one QoS management node among different nodes which are not included on a forwarding route, the forwarding route reaching from a transmitting node to a receiving node via at least one intermediate node satisfying QoS requirements; and
a route change unit, which requests a route change to the QoS management node if it is expected that its own QoS information does not satisfy the QoS requirements,
wherein the QoS manager selection unit analyzes expected lifetime information of the different nodes which are not included on the forwarding route, the expected lifetime information being received by the transmitting node existing on the forwarding route; selects a node with a longest expected lifetime among the different nodes as a QoS management node; and notifies the selected node that the node is selected as a QoS management node.

18. The intermediate node of claim 17, wherein the expected lifetime information is calculated based on a present remaining power remaining on each of the respective nodes, and is calculated according to the following equation:

$$E=P/M,$$

wherein E is a value for the expected lifetime information, P is a present remaining power of a corresponding node, M is a numeral of a transmitting/receiving message, and if the numeral of the transmitting/receiving message cannot be calculated at the time, the present remaining power of the corresponding node is calculated quantitatively.

19. The intermediate node of claim 17, wherein the QoS route change unit requests a route change to the QoS management node if QoS information of the intermediate node exceeds a predetermined threshold value.

20. At least one QoS management node of a wireless communication system communicating through a point-to-point network, which provides QoS, the QoS management node comprising:
   a QoS information management unit, which manages QoS information of other nodes which are not included on a forwarding route, the forwarding route reaching from a transmitting node to a receiving node via at least one intermediate node satisfying QoS requirements; and
   a route change unit, which changes the forwarding route on the basis of the QoS management information so that the changed forwarding route passes through a different node satisfying the QoS requirement, if it is expected that at least one intermediate node existing on the forwarding route does not satisfy the QoS requirements,
   wherein the QoS information management unit:
   requests QoS information from the different nodes which are not included on the forwarding route;
   receives QoS information of the different nodes which are not included on the forwarding route, and updates QoS management information including a list of nodes satisfying the QoS requirements and QoS information of the respective nodes;
   broadcasts a QoS information request to search for at least one new intermediate node which is not included on the forwarding route, if no node among different nodes receiving the QoS information satisfies the QoS requirements;
   updates the QoS management informnation if QoS information of the new intermediate node which is not included on the forwarding route is received; and
   exchanges the QoS management information with at least one different QoS management node and updates the QoS management information.

21. The QoS management node of claim 20, wherein the QoS management node receives a route change request from at least one intermediate node existing on the forwarding route, and selects a node which optimally satisfies QoS requirements, among different nodes which are not included on the forwarding route, on the basis of the QoS management information, and
   the route change unit changes the forwarding route so that the changed forwarding route passes through the node selected by QoS Manager selection unit.

* * * * *